(12) United States Patent
Ginoya et al.

(10) Patent No.: US 11,782,734 B2
(45) Date of Patent: Oct. 10, 2023

(54) METHOD AND SYSTEM FOR TEXT EXTRACTION FROM AN APPLICATION WINDOW FOR ROBOTIC PROCESS AUTOMATION

(71) Applicant: Automation Anywhere, Inc., San Jose, CA (US)

(72) Inventors: Hasmukh Meghabhai Ginoya, Vadodara (IN); Mahendra Parsottambhai Gajera, Vadodara (IN)

(73) Assignee: Automation Anywhere, Inc., San Jose, CA (US)

( * ) Notice: Subject to any disclaimer, the term of this patent is extended or adjusted under 35 U.S.C. 154(b) by 52 days.

(21) Appl. No.: 17/131,674

(22) Filed: Dec. 22, 2020

(65) Prior Publication Data
US 2022/0197674 A1 Jun. 23, 2022

(51) Int. Cl.
G06F 40/279 (2020.01)
G06F 9/451 (2018.01)
G06F 9/445 (2018.01)
G06F 3/14 (2006.01)

(52) U.S. Cl.
CPC ............... G06F 9/451 (2018.02); G06F 3/14 (2013.01); G06F 9/44521 (2013.01); G06F 40/279 (2020.01)

(58) Field of Classification Search
CPC ........ G06F 9/451; G06F 3/14; G06F 9/44521; G06F 40/279; G09G 5/14; G09G 5/222; G09G 2354/00
See application file for complete search history.

(56) References Cited

U.S. PATENT DOCUMENTS

| | | |
|---|---|---|
| 5,949,999 A | 9/1999 | Song et al. |
| 5,983,001 A | 11/1999 | Boughner et al. |
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |

(Continued)

FOREIGN PATENT DOCUMENTS

WO 2022/076488 4/2022

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Hien L Duong

(57) ABSTRACT

Improved techniques to access content presented on a user interface by a software program are disclosed. The improved techniques permit the content to be retrieved from process memory used by the software program. Once accessed, the content (e.g., text) can be analyzed and used to understand and interact with the software program (e.g., application program) by way of the user interface (e.g., application window). The improved techniques are well suited for Robotic process automation (RPA) system. In such cases, RPA systems are able to accurately understand the content of the user interfaces such that software automation processes can operate with increased reliability and flexibility.

16 Claims, 16 Drawing Sheets

(56) References Cited

U.S. PATENT DOCUMENTS

| | | | |
|---|---|---|---|
| 6,640,244 B1 | 10/2003 | Bowman-Amuah | |
| 6,704,873 B1 | 3/2004 | Underwood | |
| 6,718,334 B1* | 4/2004 | Han | G06F 9/451 |
| | | | 707/999.102 |
| 6,898,764 B2 | 5/2005 | Kemp | |
| 6,954,747 B1 | 10/2005 | Wang et al. | |
| 6,957,186 B1 | 10/2005 | Guheen et al. | |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2 | 7/2009 | Powell et al. | |
| 7,571,427 B2 | 8/2009 | Wang et al. | |
| 7,765,525 B1 | 7/2010 | Davidson et al. | |
| 7,802,184 B1* | 9/2010 | Battilana | G06F 40/274 |
| | | | 715/256 |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Folev | |
| 8,365,147 B2* | 1/2013 | Grechanik | G06F 11/368 |
| | | | 717/124 |
| 8,396,890 B2 | 3/2013 | Lim | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,631,458 B1 | 1/2014 | Banerjee | |
| 8,682,083 B2 | 3/2014 | Kumar et al. | |
| 8,713,003 B2 | 4/2014 | Fotev | |
| 8,769,482 B2 | 7/2014 | Batey et al. | |
| 8,819,241 B1 | 8/2014 | Washburn | |
| 8,832,048 B2 | 9/2014 | Lim | |
| 8,874,685 B1 | 10/2014 | Hollis et al. | |
| 8,943,493 B2 | 1/2015 | Schneider | |
| 8,965,905 B2 | 2/2015 | Ashmore et al. | |
| 9,013,732 B1* | 4/2015 | Madhukar | G06F 40/151 |
| | | | 358/1.14 |
| 9,032,314 B2 | 5/2015 | Mital et al. | |
| 9,104,294 B2 | 8/2015 | Forstall et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,600,519 B2 | 3/2017 | Schoning et al. | |
| 9,621,584 B1 | 4/2017 | Schmidt et al. | |
| 9,946,233 B2 | 4/2018 | Brun et al. | |
| 9,965,139 B2* | 5/2018 | Nychis | G06F 8/38 |
| 9,990,347 B2 | 6/2018 | Raskovic et al. | |
| 10,043,255 B1 | 8/2018 | Pathapati et al. | |
| 10,282,280 B1 | 5/2019 | Gouskova | |
| 10,654,166 B1* | 5/2020 | Hall | G05B 19/0426 |
| 10,706,218 B2 | 7/2020 | Milward et al. | |
| 10,824,790 B1* | 11/2020 | LeCounte | G06V 30/414 |
| 10,885,423 B1* | 1/2021 | Voicu | G06F 3/04817 |
| 11,176,443 B1 | 11/2021 | Selva | |
| 11,182,178 B1 | 11/2021 | Singh et al. | |
| 11,294,793 B1* | 4/2022 | Stan | G06F 11/362 |
| 11,314,531 B1* | 4/2022 | Mayer | G06F 9/547 |
| 11,334,471 B1* | 5/2022 | Stocker | G06F 11/3684 |
| 2003/0033590 A1 | 2/2003 | Leherbauer | |
| 2003/0101245 A1 | 5/2003 | Srinivasan et al. | |
| 2003/0159089 A1 | 8/2003 | DiJoseph | |
| 2004/0083472 A1 | 4/2004 | Rao et al. | |
| 2004/0153649 A1 | 8/2004 | Rhoads | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2007/0156677 A1 | 7/2007 | Szabo | |
| 2008/0005086 A1 | 1/2008 | Moore | |
| 2008/0027769 A1 | 1/2008 | Eder | |
| 2008/0028392 A1 | 1/2008 | Chen et al. | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0116071 A1 | 5/2009 | Mantell | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Marlone | |
| 2010/0023933 A1 | 1/2010 | Bryant et al. | |
| 2010/0100605 A1 | 4/2010 | Allen et al. | |
| 2010/0106671 A1 | 4/2010 | Li et al. | |
| 2010/0138015 A1 | 6/2010 | Colombo et al. | |
| 2010/0235433 A1 | 9/2010 | Ansari et al. | |
| 2010/0251163 A1 | 9/2010 | Keable | |
| 2011/0022578 A1 | 1/2011 | Folev | |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0011458 A1 | 1/2012 | Xia et al. | |
| 2012/0042281 A1 | 2/2012 | Green | |
| 2012/0124062 A1 | 5/2012 | Macbeth et al. | |
| 2012/0131456 A1 | 5/2012 | Lin et al. | |
| 2012/0324333 A1 | 12/2012 | Lehavi | |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0036290 A1 | 2/2014 | Miyagawa | |
| 2014/0045484 A1 | 2/2014 | Kim et al. | |
| 2014/0173415 A1* | 6/2014 | Kattil Cherian | G06F 40/143 |
| | | | 715/234 |
| 2014/0181705 A1 | 6/2014 | Hey et al. | |
| 2015/0082280 A1 | 3/2015 | Betak et al. | |
| 2015/0310268 A1 | 10/2015 | He | |
| 2015/0347284 A1 | 12/2015 | Hey et al. | |
| 2016/0019049 A1 | 1/2016 | Kakhandiki et al. | |
| 2016/0034441 A1 | 2/2016 | Nguyen et al. | |
| 2016/0078368 A1 | 3/2016 | Kakhandiki et al. | |
| 2018/0107651 A1* | 4/2018 | Hamilton | H04M 1/72436 |
| 2018/0113781 A1 | 4/2018 | Kim | |
| 2018/0275835 A1 | 9/2018 | Prag | |
| 2019/0126463 A1 | 5/2019 | Purushothaman | |
| 2019/0141596 A1 | 5/2019 | Gay | |
| 2019/0188462 A1 | 6/2019 | Nishida | |
| 2019/0317803 A1 | 10/2019 | Maheshwari | |
| 2019/0324781 A1 | 10/2019 | Ramamurthy | |
| 2019/0340240 A1 | 11/2019 | Duta | |
| 2020/0249964 A1* | 8/2020 | Fernandes | G06F 9/451 |
| 2021/0042518 A1* | 2/2021 | Khandekar | G06F 16/383 |
| 2021/0397157 A1* | 12/2021 | Cote | G06N 20/00 |
| 2022/0019195 A1* | 1/2022 | Yu | H04L 51/02 |
| 2022/0035641 A1* | 2/2022 | Singh | B25J 13/06 |

(56) References Cited

U.S. PATENT DOCUMENTS

2022/0245936 A1 8/2022 Valk
2022/0405094 A1* 12/2022 Farquhar ............. G06F 9/44505

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2006).
Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on moble device, May 2010, 7 pages.
Non-Final Office Action for U.S. Appl. No. 17/230,492, dated Oct. 14, 2022.
Notice of Allowance for U.S. Appl. No. 16/398, 532, dated Oct. 23, 2022.
Non-Final Office Action for U.S. Appl. No. 16/876,530, dated Sep. 29, 2020.
Final Office Action for U.S. Appl. No. 16/876,530, dated Apr. 13, 2021.
Notice of Allowance for U.S. Appl. No. 16/876,530, dated Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards realOtime object detection with region proposal network." Advances in neutral information processing systems 28 (2015). (Year: 2015).
Zhifang et al., Test automation on mobile device, May 2010, 7 pages.
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.

\* cited by examiner

| Index | wcLow | cGlyphs | Index | wcLow | cGlyphs | Index | wcLow | cGlyphs |
|---|---|---|---|---|---|---|---|---|
| 0 |  | 1 | 54 | Y | 1 | 108 | Ã¿ | 1 |
| 1 |  | 95 | 55 | [ | 1 | 109 | Â | 2 |
| 2 | Â | 728 | 56 | ] | 1 | 110 | Âª | 3 |
| 3 | z | 6 | 57 | _ | 31 | 111 | Â² | 1 |
| 4 | â€ž | 7 | 58 | â,¬ | 53 | 112 | Âº | 1 |
| 5 | Å' | 1 | 59 | Â¶ | 15 | 113 | Â¼ | 1 |
| 6 | Å½ | 20 | 60 | Ã† | 14 | 114 | Ã„ | 1 |
| 7 | Â£ | 397 | 61 | Ã– | 6 | 115 | Ãš | 3 |
| 8 | 1 | 38 | 62 | Ã | 19 | 116 | Ã | 1 |
| 9 | Y | 7 | 63 | Ã² | 3 | 117 | Ã~ | 2 |
| 10 | a | 39 | 64 | Ã¶ | 9 | 118 | Ã¡ | 1 |
| 11 | â€° | 2 | 65 |  | 35 | 119 | ` | 2 |
| 12 | Â | 3 | 66 | & | 1 | 120 | c | 1 |
| 13 | â€~ | 55 | 67 | ( | 9 | 121 | e | 2 |
| 14 | Ã | 27 | 68 | 2 | 3 | 122 | o | 1 |
| 15 | Ã° | 5 | 69 | 9 | 2 | 123 | v | 10 |
| 16 |  | 29 | 70 | < | 3 | 124 | ` | 32 |
| 17 | - | 226 | 71 | D | 1 | 125 |  | 38 |
| 18 | P | 48 | 72 | ^ | 2 | 126 | ' | 1 |
| 19 | Ã€ | 10 | 73 | p | 2 | 127 | - | 1 |
| 20 | Â | 21 | 74 | t | 27 | 128 | Ã | 32 |
| 21 | Â¶ | 8 | 75 | Â | 13 | 129 |  | 1 |
| 22 | Ã" | 44 | 76 | Â | 32 | 130 | 2 | 10 |
| 23 | f | 10 | 77 | Ã£ | 1 | 131 | Ã | 48 |
| 24 | Ã¡ | 10 | 78 | Ã° | 1 | 132 |  | 10 |
| 25 | Ã² | 2 | 79 |  | 1 | 133 | @ | 96 |
| 26 | f | 10 | 80 |  | 1 | 134 |  | 175 |
| 27 | Ã¡ | 10 | 81 |  | 2 | 135 | Â° | 8 |
| 28 | Ã± | 1 | 82 | " | 1 | 136 | Ã· | 9 |
| 29 | f | 10 | 83 | & | 1 | 137 | 0 | 54 |
| 30 | Ã¡ | 10 | 84 | . | 1 | 138 |  | 7 |
| 31 | Ã¹ | 1 | 85 | 3 | 1 | 139 |  | 5 |
| 32 | f | 10 | 86 | M | 2 | 140 |  | 26 |
| 33 | Ã¡ | 10 | 87 | P | 16 | 141 | 8 | 5 |
| 34 | f | 10 | 88 | l | 4 | 142 | > | 1 |
| 35 | ? | 1 | 89 | z | 16 | 143 | @ | 2 |
| 36 | P | 10 | 90 | Â | 5 | 144 | C | 2 |
| 37 | Ã | 10 | 91 | â€" | 1 | 145 | F | 124 |
| 38 |  | 10 | 92 | â„¢ | 1 | 146 | Ã" | 45 |
| 39 | @ | 10 | 93 |  | 1 | 147 | ^ | 6 |

FIG. 5C-1

| 40 | Â | 38 | 94 |  | 1 | 148 | Ã² | 3 |
| --- | --- | --- | --- | --- | --- | --- | --- | --- |
| 41 | Ã‡ | 1 | 95 |  | 1 | 149 | < | 4 |
| 42 | Ã | 1 | 96 |  | 2 | 150 | Ã² | 1 |
| 43 | Ã | 48 | 97 |  | 1 | 151 | Ã´ | 1 |
| 44 | Ã› | 1 | 98 |  | 2 | 152 | Ãº | 4 |
| 45 | Ã | 10 | 99 | - | 2 | 153 |  | 4 |
| 46 |  | 10 | 100 | ) | 1 | 154 | X | 1 |
| 47 | Ã | 11 | 101 | + | 1 | 155 | p | 5 |
| 48 |  | 203 | 102 | 4 | 1 | 156 | v | 135 |
| 49 | Ã¾ | 280 | 103 | 6 | 1 | 157 | Ã¿ | 1 |
| 50 |  | 6 | 104 | H | 1 | 158 | Ã¼ | 2 |
| 51 |  | 38 | 105 | ` | 2 |  |  |  |
| 52 | H | 6 | 106 | d | 2 |  |  |  |
| 53 | P | 8 | 107 | Ã² | 1 |  |  |  |

FIG. 5C-2

| index | value |
|---|---|
| 0 | |
| 1 | |
| 2 | ! |
| 3 | " |
| 4 | # |
| 5 | $ |
| 6 | % |
| 7 | & |
| 8 | ' |
| 9 | ( |
| 10 | ) |
| 11 | * |
| 12 | + |
| 13 | |
| 14 | - |
| 15 | . |
| 16 | / |
| 17 | 0 |
| 18 | 1 |
| 19 | 2 |
| 20 | 3 |
| 21 | 4 |
| 22 | 5 |
| 23 | 6 |
| 24 | 7 |
| 25 | 8 |
| 26 | 9 |
| 27 | : |
| 28 | ; |
| 29 | < |
| 30 | = |
| 31 | > |
| 32 | ? |
| 33 | @ |
| 34 | A |
| 35 | B |
| 36 | C |
| 37 | D |
| 38 | E |
| 39 | F |

FIG. 5D-1

| index | value |
|---|---|
| 40 | G |
| 41 | H |
| 42 | I |
| 43 | J |
| 44 | K |
| 45 | L |
| 46 | M |
| 47 | N |
| 48 | O |
| 49 | P |
| 50 | Q |
| 51 | R |
| 52 | S |
| 53 | T |
| 54 | U |
| 55 | V |
| 56 | W |
| 57 | X |
| 58 | Y |
| 59 | Z |
| 60 | [ |
| 61 | \ |
| 62 | ] |
| 63 | ^ |
| 64 | _ |
| 65 | ` |
| 66 | a |
| 67 | b |
| 68 | c |
| 69 | d |
| 70 | e |
| 71 | f |
| 72 | g |
| 73 | h |
| 74 | i |
| 75 | j |
| 76 | k |
| 77 | l |
| 78 | m |
| 79 | n |
| 80 | o |
| 81 | p |

FIG. 5D-2

METHOD AND SYSTEM FOR TEXT EXTRACTION FROM AN APPLICATION WINDOW FOR ROBOTIC PROCESS AUTOMATION

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are well suited to repeatedly and accurately perform repetitive tasks.

Unfortunately, however, when software robots seek to interact with one or more software applications through user interfaces as a human would do, they often require an understanding of what is presented by the user interfaces. Because the RPA systems are normally not integrated with the one or more software application being used by the software robots, there are numerous challenges and complexities with understanding what text is presented by the user interfaces.

One prior approach to understanding text displayed by a user interface uses a screen capture followed by Optical Character Recognition (OCR) processing. While an OCR-based approach is effective, it can be subjected to errors due to resolution, size, display drivers, etc. associated with the screen capture. Therefore, there is a need for improved approaches to understand and interact with user interfaces of software applications such that RPA systems are able to accurately understand displayed content of the user interfaces so that software robots can operate with increased reliability and flexibility.

SUMMARY

Embodiments disclosed herein concern improved techniques to access content presented on a user interface by a software program. The improved techniques permit the content to be retrieved from process memory used by the software program. Once accessed, the content (e.g., text) can be analyzed and used to understand and interact with the software program (e.g., application program) by way of the user interface (e.g., application window). Consequently, RPA systems are able to accurately understand the content of the user interfaces such that software automation processes can operate with increased reliability and flexibility.

The invention can be implemented in numerous ways, including as a method, system, device, apparatus (including computer readable medium and graphical user interface). Several embodiments of the invention are discussed below.

As a computer-implemented method for accessing text within an application window, one embodiment can, for example, include at least: identifying a running application program on a computing device that is configured to provide the application window on a display device associated with the computing device, the computing device including process memory used in executing the running application program; locating a portion of the process memory that is allocated to the running application program; injecting a text access program code into the portion of the process memory allocated to the running application program; capturing, using the text access program code, graphical characters pertaining to text presented in the application window; and converting the captured graphical characters to computer readable text codes, the computer readable text codes representing the text presented in the application window.

As a non-transitory computer readable medium including at least computer program code tangible stored thereon for accessing text within an application window, one embodiment can, for example, include at least: computer program code for identifying a running application program on a computing device that is configured to provide the application window on a display device associated with the computing device, the computing device including process memory used in executing the running application program; computer program code for locating a portion of the process memory that is allocated to the running application program; computer program code for inserting a text access program code into the portion of the process memory allocated to the running application program; computer program code for capturing, using the text access program code, graphical characters pertaining to text presented in the application window; and computer program code for converting the captured graphical characters to computer readable text codes, the computer readable text codes representing the text presented in the application window.

As a computer-implemented method for facilitating robotic process automation, one embodiment can, for example, include at least: identifying a software automation process that facilitates automation of a previously captured series of user interactions; initiating execution of the software automation process, the software automation process configured to interact with at least one user interface produced by an application program operating on the at least one computing device, the at least one user interface presented on a display screen associated with at least one computing device; locating data content within the user interface as stored in memory of the at least one computing device that is allocated to the application program; accessing the data content for the at least one user interface from the memory of the at least one computing device allocated to the application program; determining text within the at least one user interface based on the accessed data content; and affecting a programmatic action with respect to the application program, the programmatic action being requested by the software automation process based at least in part on the determined text.

As a non-transitory computer readable medium including at least computer program code tangible stored thereon for facilitating robotic process automation, one embodiment can, for example, include at least: computer program code for identifying a software automation process that facilitates automation of a previously captured series of user interactions; computer program code for initiating execution of the software automation process, the software automation process configured to interact with at least one user interface produced by an application program operating on the at least one computing device, the at least one user interface presented on a display screen associated with at least one computing device; computer program code for locating data content within the user interface as stored in memory of the at least one computing device that is allocated to the application program; computer program code for accessing the data content for the at least one user interface from the memory of the at least one computing device allocated to the application program; computer program code for determining text within the at least one user interface based on the accessed data content; and computer program code for affecting a programmatic action with respect to the application program, the programmatic action being requested by the software automation process based at least in part on the determined text.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIGS. 5C-1 and 5C-2 illustrate an exemplary memory table providing glyph set data.

FIGS. 5D-1 and 5D-2 illustrate an initial portion of an exemplary all character memory table.

DETAILED DESCRIPTION OF CERTAIN EMBODIMENTS

Figure 1:
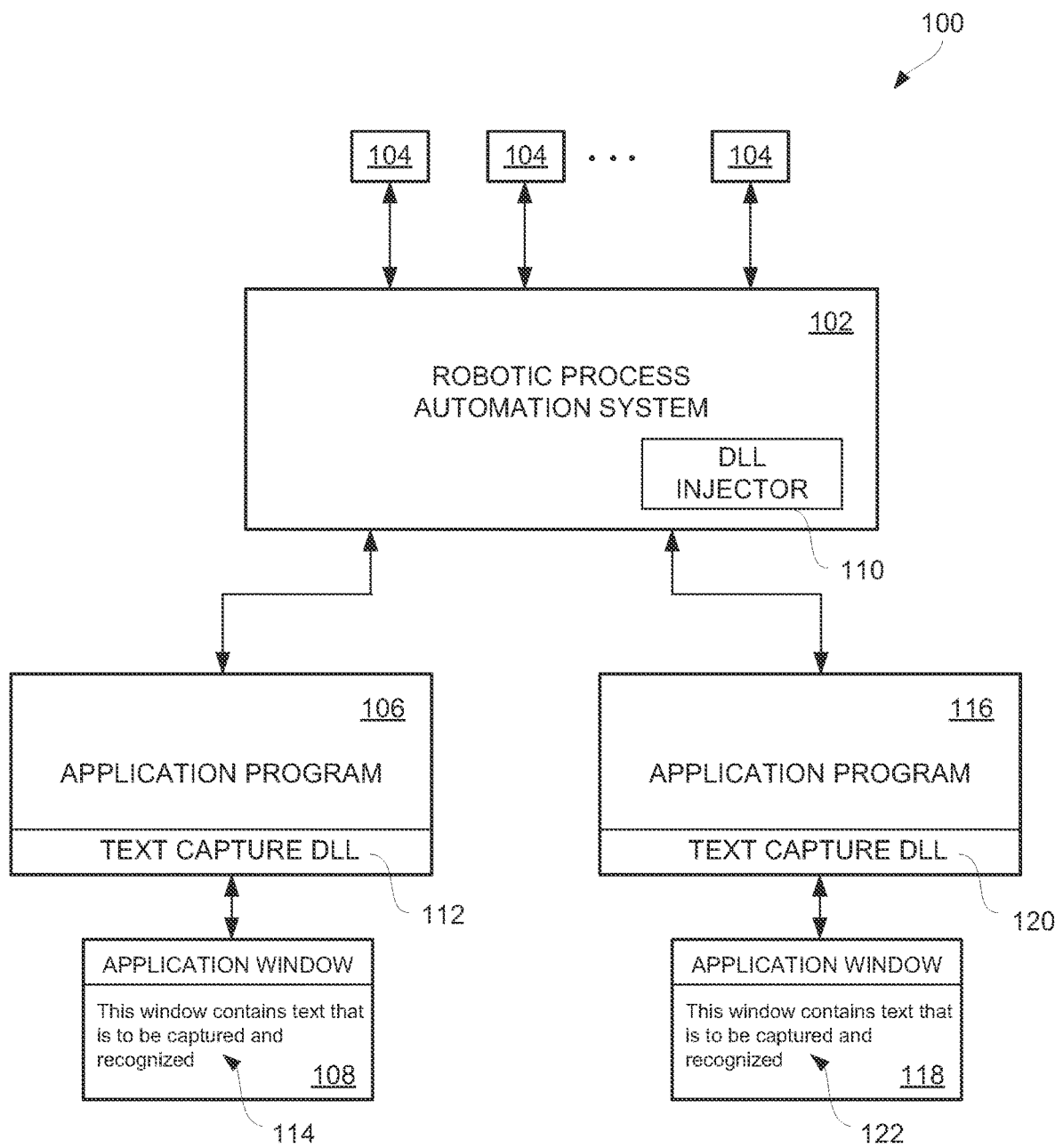
FIG. 1 is a block diagram of a programmatic automation environment according to one embodiment.

Embodiments disclosed herein concern improved techniques to access content presented on a user interface by a software program. The improved techniques permit the content to be retrieved from process memory used by the software program. Once accessed, the content (e.g., text) can be analyzed and used to understand and interact with the software program (e.g., application program) by way of the user interface (e.g., application window).

The improved techniques enable acquisition of content associated with a user interface directly from process memory. As compared to conventional OCR approaches that rely on screen capture, the improved techniques are able to avoid the conventional difficulties presented by changes in resolution, size, display drivers, etc. Consequently, RPA systems are able to accurately understand the content of the user interfaces such that software automation processes can operate with increased reliability and flexibility.

Generally speaking, RPA systems use computer software to emulate and integrate the actions of a human interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required humans to perform. The RPA systems support a plurality of software automation processes. The RPA systems also provide for creation, configuration, management, execution, monitoring, and performance of software automation processes.

A software automation process can also be referred to as a software robot, software agent, or a bot. A software automation process can interpret and execute tasks on your behalf. Software automation processes are particularly well suited for handling a lot of the repetitive tasks that humans perform every day. Software automation processes can perform a task or workflow they are tasked with once or 10,000 times and do so accurately every time. As one example, a software automation process can locate and read data in a document, email, file, or window. As another example, a software automation process can connect with one or more Enterprise Resource Planning (ERP), Customer Relations Management (CRM), core banking, and other business systems to distribute data where it needs to be in whatever format is necessary. As another example, a software automation process can perform data tasks, such as reformatting, extracting, balancing, error checking, moving, copying, etc. As another example, a software automation process can retrieve data from a webpage, application, screen, file, or other data source. As still another example, a software automation process can be trigger based on time or an event, and can serve to take files or data sets and move them to another location, whether it is to a customer, vendor, application, department or storage. These various capabilities can also be used in any combination. As an example of an integrated software automation process, the software automation process can start a task or workflow based on a trigger, such as a file being uploaded to an FTP system. The integrated software automation process can then download that file, scrape relevant data from it, upload the relevant data to a database, and then send an email to inform the recipient that the data has been successfully processed.

Embodiments of various aspects of the invention are discussed below with reference to FIGS. 1-11. However, those skilled in the art will readily appreciate that the detailed description given herein with respect to these figures is for explanatory purposes as the invention extends beyond these limited embodiments.

FIG. 1 is a block diagram of a programmatic automation environment 100 according to one embodiment. The programmatic automation environment 100 is a computing environment that supports robotic process automation. The computing environment can include or make use of one or more computing devices. Each of the computing devices can, for example, an electronic device, such as a mobile phone (e.g., smart phone), tablet computer, desktop computer, server computer, and the like.

The programmatic automation environment 100 includes a robotic process automation system 102 that provides the robotic process automation. The robotic process automation system 102 supports a plurality of different robotic processes, which are denoted software automation processes 104. These software automation processes 104 can also be referred to as "bots" or "software bots." The robotic process automation system 102 can create, maintain, execute, and/or monitor software automation processes 104. The robotic process automation system 102 can also report status or results of software automation processes 104.

On execution of one or more of the software automation processes 104, the software automation processes 104, via robotic process automation system 102, can interact with one or more application programs. Application program 106, when operating, typically produces an application window 108. Often the application window 108 displays text and/or graphics on a display device.

When robotic process automation operations are being performed, the robotic process automation system 102 seeks to interact with the application program 106. However, since the robotic process automation system 102 is not integrated with the application program 106, the robotic process automation system 102 requires an ability to understand what content is being presented in the application window 108. In this regard, the robotic process automation system 102 interacts with the application program 106 by interacting with the content in the application window 108 corresponding to the application program 106. By doing so, the software automation process 104 being carried out via the robotic process automation system 102 can effectively interface with the application window 108 as would a user, even though no user is involved because the actions by the software automation process 104 are programmatically performed.

In one embodiment, access to content presented in the application window 108 can be obtained from operating memory of a computing device performing the application program 106. To do so, according to one embodiment, the robotic process automation system 102 can make use of a Dynamic Linked Library (DLL) injector 110. The DLL injector 110 can serve to inject text access program code, such as at least one test capture DLL 112, into the operating memory of the computing device performing the application program 106. The injection of the text access program code inserts or stores the text access code into the operating memory of the computing device performing the application program 106. Once the text capture DLL 112 has been injected, the robotic process automation system 102, in performing the software automation process 104, can make use of the text capture DLL 112 to capture text 114 presented in the application window 108. Once the text is captured and understood, the robotic process automation system 102 can perform an action requested by the software automation process 104 by inducing action with respect to the application window 108 which in turn interacts with the application program 106.

In some cases, the software automation process 104 can seek to interact with more than one application program. Hence, the robotic process automation system 102 shown in FIG. 1 can also interface with an application program 116. The application program 116, when operating, typically produces an application window 118. Often the application window 118 displays text and/or graphics on a display device.

When robotic process automation operations are being performed, the robotic process automation system 102 seeks to interact with the application program 116. However, since the robotic process automation system 102 is not integrated with the application program 116, the robotic process automation system 102 requires an ability to understand what content is being presented in the application window 118. In this regard, the robotic process automation system 102 interacts with the application program 116 by interacting with the content in the application window 118 corresponding to the application program 116. By doing so, the software automation process 104 being carried out via the robotic process automation system 102 can efficiently interface with the application window 118 as would a user, even though no user is involved because the actions by the software automation process 104 are programmatically performed.

In one embodiment, access to content presented in the application window 118 can be obtained from operating memory of a computing device performing the application program 116. The computing device performing the application program 116 can be the same computing device as the computing device performing the application program 106, or the computing device performing the application program 116 can be a different computing device. To do so, according to one embodiment, the robotic process automation system 102 can make use of the DLL injector 110. The DLL injector 110 can serve to inject text access program code, such as at least one test capture DLL 120, into the operating memory of the computing device performing the application program 116. Once the text capture DLL 120 has been injected, the robotic process automation system 102 in performing the software automation process 104 can make use of the text capture DLL 120 to capture text 118 presented in the application window 118. Once the text is captured and understood, the robotic process automation system 102 can perform an action requested by the software automation process 104 by inducing action with respect to the application window 118 which in turn interacts with the application program 116.

Figure 2:
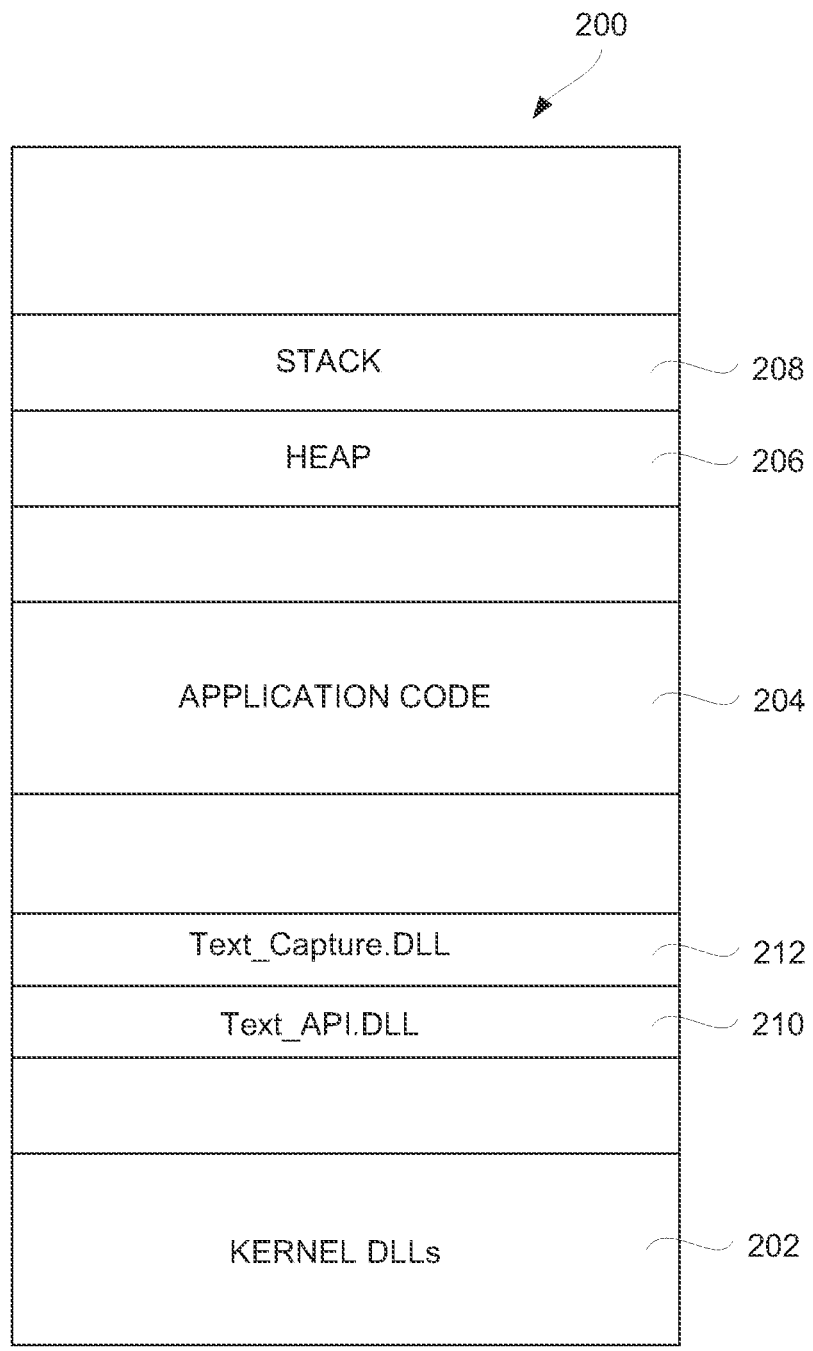
FIG. 2 is a virtual memory map according to one embodiment.

FIG. 2 is a virtual memory map 200 according to one embodiment. The virtual memory map 200 pertains to a representative virtual memory, such as being utilized in a Windows® operating environment. The virtual memory map 200 includes Kernel Dynamic Linked Libraries (DLLs) 202. The Kernel DLLs 202 are in a portion of the virtual memory map that is not user-accessible. The remaining portions of the virtual memory map 200 are typically user-accessible. The virtual memory map 200 includes application code 204. This represents the application code 204 residing in process memory when a corresponding application is running. Additionally, conventional operating system data storage structures, such as a heap 206 and a stack 208, are also resident in the virtual memory map 200. Still further, in accordance with one embodiment to facilitate text capture, the virtual memory map 200 also notes that the virtual memory includes one or more DLLs that are placed within the virtual memory map 200 so that they can interact with the application code 204, to access and capture text being produced by the application program. These one or more DLLs, as illustrated in FIG. 2, can include a Text_API.DLL 210 and/or a Text_Capture.DLL 212.

Figure 3:
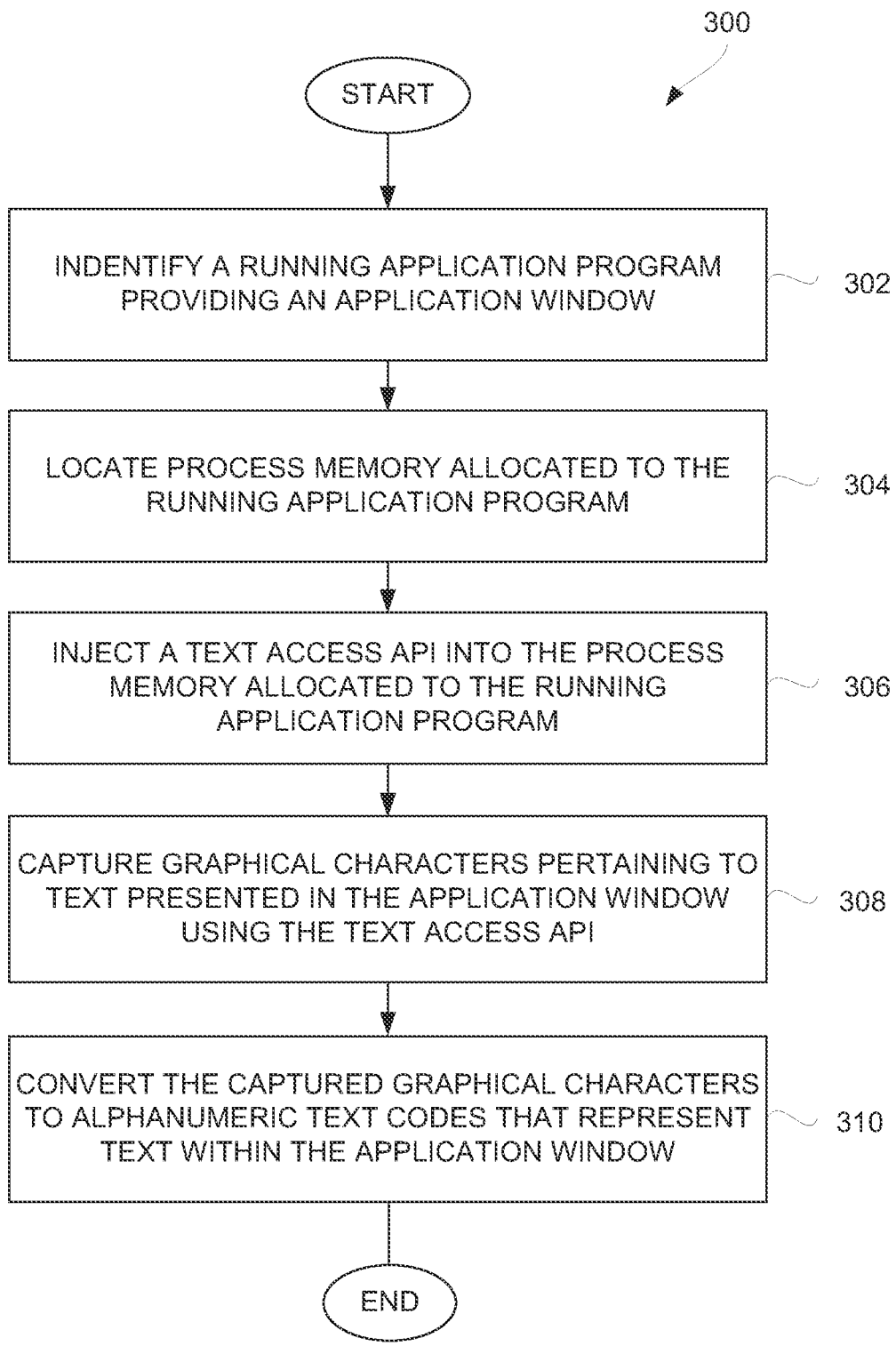
FIG. 3 is a flow diagram of a text access process according to one embodiment.

FIG. 3 is a flow diagram of a text access process 300 according to one embodiment. The text access process 300 operates on a computing device. For example, the computing device can be a computer that is capable of executing an operating system as well as one or more application programs. The computer can be a desktop computer, a notebook computer, a tablet computer, a server computer, a mobile phone (e.g., smart phone), or any other similar computing or electronic device.

The text access process 300 can identify 302 a running application program providing an application window. Typically, the computing device includes or is associated with a display device that can present one or more application windows to its user. Here, the running application program that is providing an application window can be identified 302. For example, the running application program can be determined through use of a process ID. Next, process memory that is allocated to the running application program can be located 304. Once the running application program is known, the process memory allocated thereto can be located 304.

Next, the text access process 300 can inject 306 a text access API into the process memory allocated to the running application program. The text access API is utilized to gain access to text that is presented by the running application program in the application window. Then, graphical characters pertaining to text being presented in the application window can be captured 308 using the text access API. An API is an interface to a library of code. A Dynamic Link Library (DLL) is one way of providing an API.

After the graphical characters have been captured 308, the captured graphical characters can be converted 310 to alphanumeric text codes that represent text within the application window. At this point, the text access process 300 has captured the text within the application window and can thereafter utilize the text in the context of further processing. The further processing can vary depending upon application; however, one particular well-suited application concerns robotic process automation. As explained in greater detail below, robotic process automation typically needs to understand what is presented and an application window for one or more application programs. The ability to access text presented in application windows by way of access to the memory supporting the application window, facilitates robotic process automation.

Figure 4:
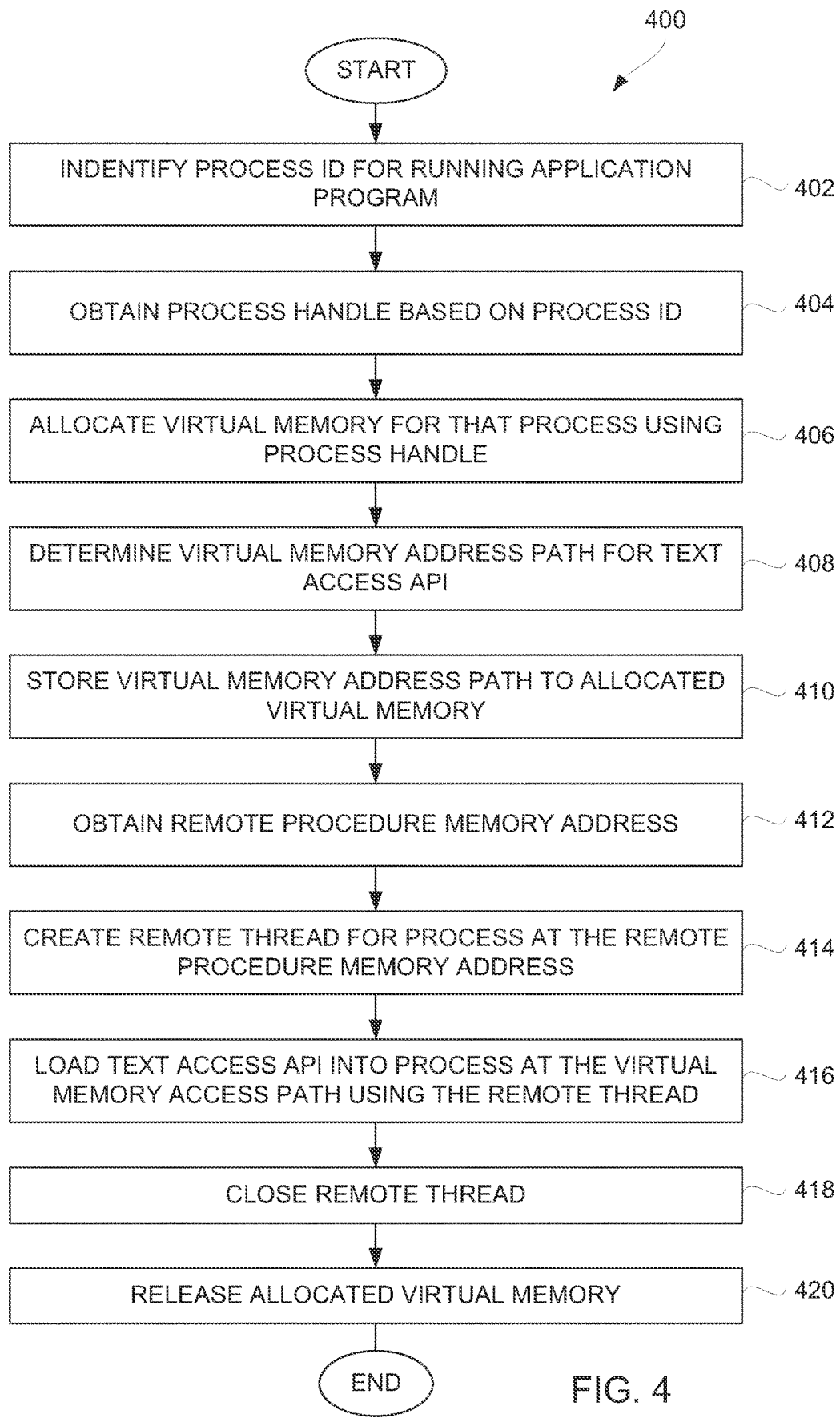
FIG. 4 is a flow diagram of an Application Programming Interface (API) injection process according to one embodiment.

FIG. 4 is a flow diagram of an application programming interface (API) injection process 400 according to one embodiment. The API injection process 400 can serve to inject a text access API into process memory. For example, the API injection process 400 can, for example, be performed by the injection 306 operation of the text access process 300.

The API injection process 400 can initially identify 402 a process identifier (ID) for a process that is running an application program. Then, a process handle can be obtained 404 based on the process identifier. Next, virtual memory for that process can be allocated 406 using the process handle.

The API injection process 400 can then determine 408 a virtual memory address path for the text access API. The virtual memory access path for the text access API can then be stored 410 to the allocated virtual memory. Additionally, a remote procedure memory address can be obtained 412. Then, a remote thread for the process at the remote procedure memory address can be created 414.

Next, to initiate the remote thread, the text access API can be loaded 416 into the process at the virtual memory access path. Once the text access API has been loaded 416 into the allocated virtual memory, the remote thread can be closed 418. Thereafter, the allocated virtual memory that was used to facilitate the injection of the text access API into the virtual memory can be released 420 and the API injection process 400 can end.

Figure 5A:
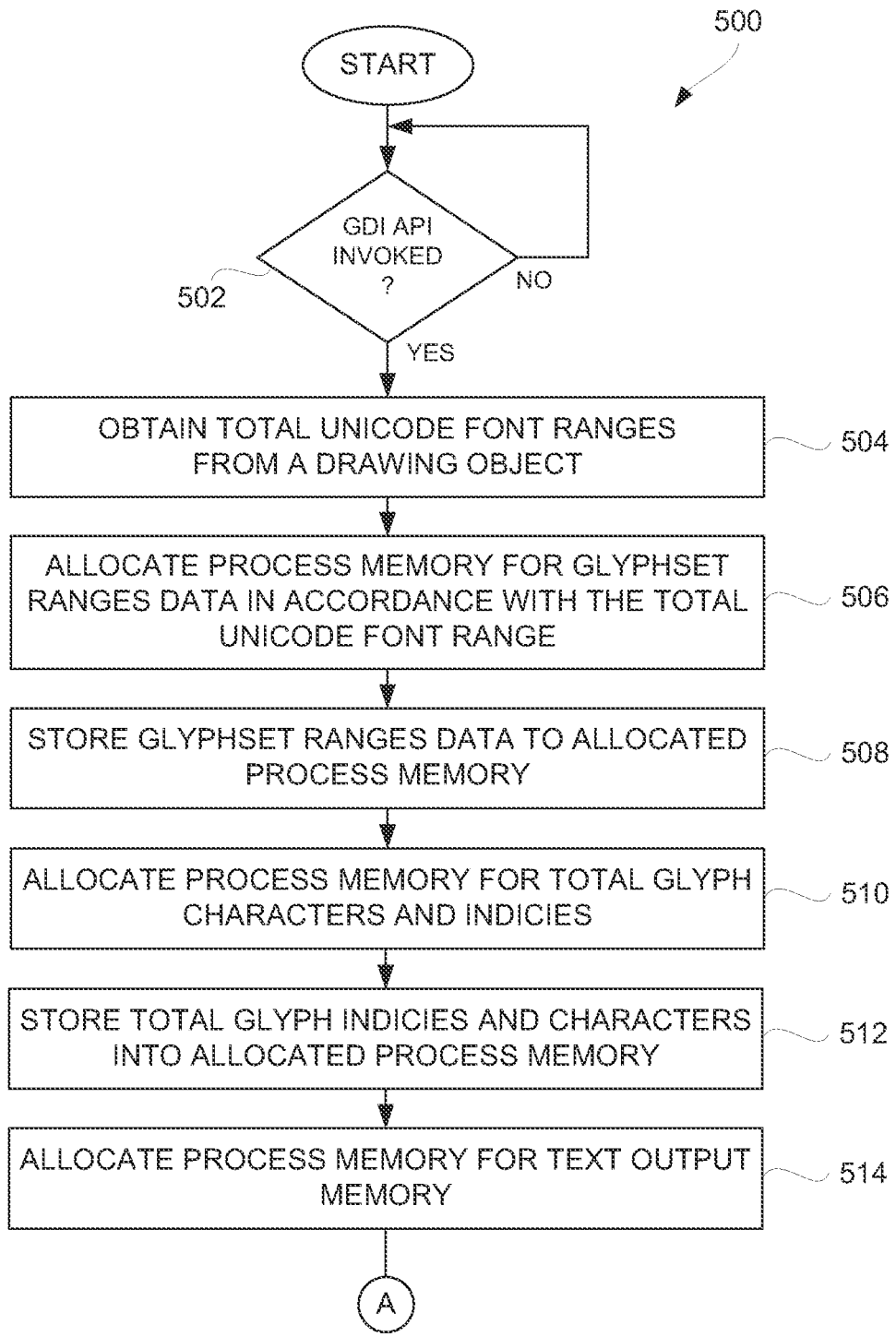
FIGS. 5A and 5B are flow diagrams of a text capture process according to one embodiment.
Figure 5B:
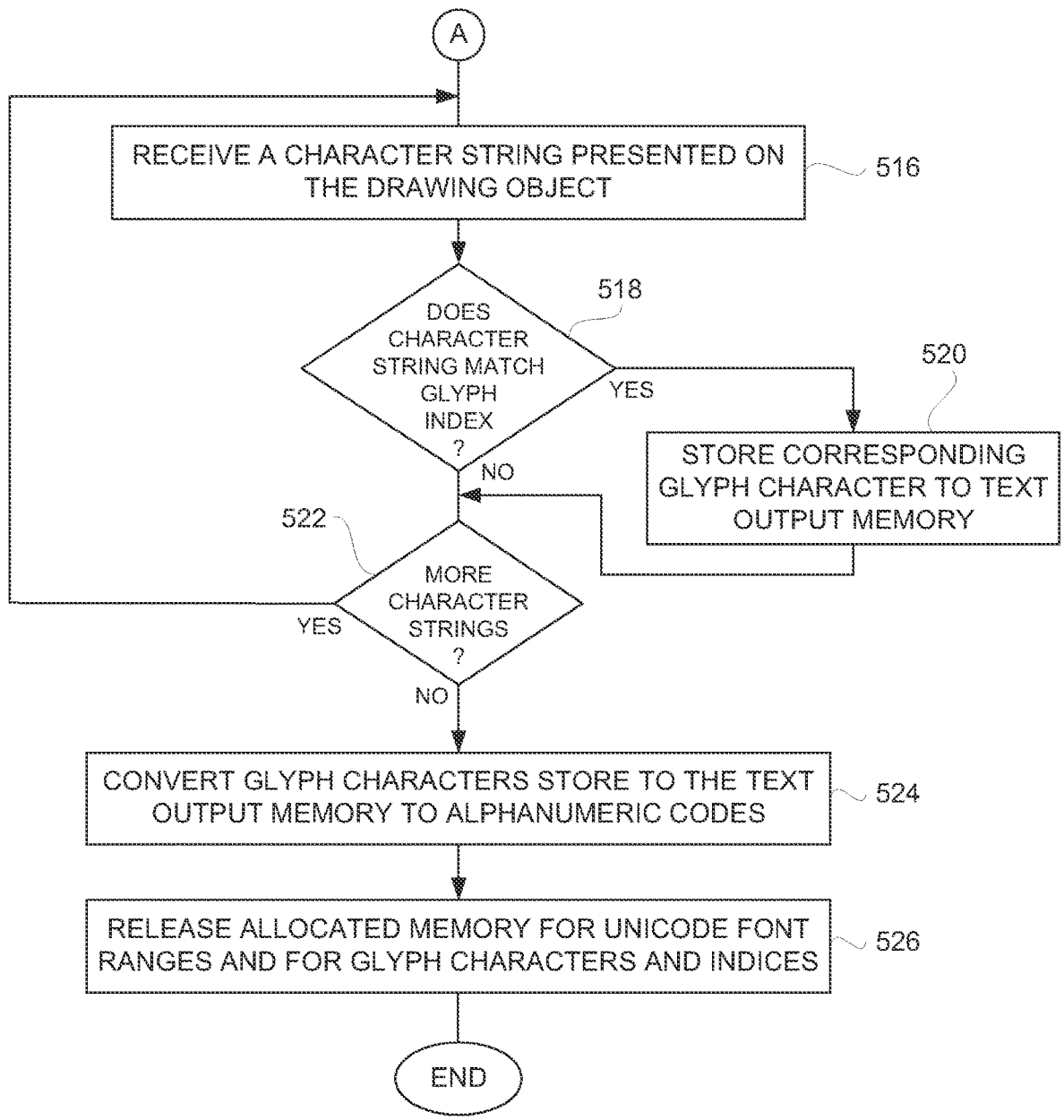

FIG. 5A-5B are flow diagrams of a text capture process 500 according to one embodiment. The text capture process 500 can, for example, be performed by the text access API of the text access process 300 discussed with reference to FIG. 3 or the API injection process 400 discussed with reference to FIG. 4. More generally, the text capture process 500 can be performed by the text access program code discussed with reference to FIG. 1.

The text capture process 500 can include a decision 502 that determines whether a Graphical Display Interface (GDI) API has been invoked. For example, a GDI API can be invoked when an application window is to be redrawn. As an example, the application window is redrawn when the application window is refreshed. In such a case, a command to redraw can be intercepted by the text access API. When the decision 502 determines that a GDI API has not been invoked, then the text capture process 500 can await the same.

On the other hand, when the decision 502 determines that a GDI API has been invoked, then the text capture process 500 can continue. In this regard, total Unicode font ranges can be obtained 504 from a drawing object. For example, the drawing object can pertain to an application window that is presented on a display device associated with a computing device on which the application program and the text capture API are operating. Next, process memory can be allocated 506 for glyphset ranges data in accordance with the total Unicode font range. Here, using the total Unicode font range, the corresponding glyphset range can be identified. The allocated process memory for the glyphset ranges is sufficient to store the corresponding glyphset range. Thereafter, the glyphset ranges data can be stored 508 to the allocated process memory.

Additionally, process memory can also be allocated 510 for total glyph characters and indices. Thereafter, the total glyph characters and indices can be stored 512 into the allocated process memory. For the glyphset ranges utilized by the drawing object, the total glyph characters and indices are utilized to recognize glyph characters and facilitating their conversion to alphanumeric characters. Still further, process memory can be allocated 514 for text output memory. The resulting converted text output can be stored in the text output memory.

Following block 514, the glyph-to-text conversion can be performed. In this regard, various character strings received via the GDI API can be processed from glyphs to alphanumeric codes. Specifically, the text capture process 500 can receive 516 a character string presented on the drawing object. Next, a decision 518 can determine whether the character string matches a glyph index. In this regard, the glyph indices and characters stored in the allocated process memory can be utilized to determine whether the character string matches a glyph index within the various glyph indices and characters stored to the allocated process memory. When the decision 518 determines that the character string does match a glyph index, then the corresponding glyph pertaining to the matching glyph index can be stored 522 the text output memory. Alternatively, when the decision 518 determines that the character string does not match any of the glyph indices or following the block 520 after a matching glyph character has been stored, a decision 522 can determine whether there are more character strings to be processed. For example, when all the character strings within the drawing object have been considered and processed, there are no more character strings to be processed. Hence, when the decision 522 determines that there are more character strings to be processed, the text capture process 500 can return to repeat the block 516 and subsequent blocks so that additional character strings can be processed in a similar fashion.

After the decision 522 determines that there are no more character strings to be processed, the glyph characters stored to the text output memory can be converted 524 into alphanumeric codes. The conversion 524 can be performed by use of a mapping between glyph character and alphanumeric codes. After the various glyph characters have been converted to alphanumeric codes, the allocated memory for the Unicode font ranges and for glyph characters and indices can be released 526, since such data is no longer needed. Thereafter, the text capture process 500, according to one embodiment, is completed.

In one embodiment, when a window produced for an application is redrawn (e.g., refreshed), a text out API of the GDI 32 DLL can be invoked. The text out API having a handle of the device context (HDC) from process memory is invoked and operates to fetch all the font Unicode ranges being used (i.e., total font Unicode ranges). Then, glyph set memory can be allocated based on the total font Unicode ranges for all glyph set data from the process memory for the application.

As an example, in the case of a window produced by a notepad application, then using the handle of the device context (HDC) for the process memory, a glyph set memory table and its data can be received.

FIGS. 5C-1 and 5C-2 illustrate an exemplary memory table providing glyph set data. For this example, there are 3903 cGlyphs supported, with 159 different Unicode ranges (i.e., cRanges) therein. Each cGlyph represents the number of Unicode code points of a given range. For each of the different Unicode ranges (cRange), the exemplary memory table includes an index for each cRange, the number of supported cGlyphs in the corresponding cRange, and a low Unicode code point (wcLow) for the corresponding cRange.

In this exemplary situation, there are a total of 3903 Unicode code points pertaining to Unicode fonts as noted in the exemplary memory table, such as shown in FIGS. 5C-1 and 5C-2. Memory can be allocated to store all 3903 characters. Once allocated, the character data can be stored to the allocated memory. All the 3903 characters can be stored in the allocated memory, such that the allocated memory stores all supported glyphs. This resulting all character data can be stored as a table, which can be referred to as an all character memory table. FIGS. 5D-1 and 5D-2 illustrate an initial portion of an exemplary all character memory table 560.

In one embodiment, data (i.e., text in value) is retrieved from the process memory using the appropriate process handle. Then, if the text in value matches an index, the text out value is thus provided by the all character memory table.

For example, if the text in value is "+HOS", by locating the matching indices, the text out value can be identified, obtained from the all character memory table, and then provided as the text output as "Help". For example, if the received text in character matches an indices memory value, then the text out value can be retrieved from the all character memory table. For instance, the following Table I illustrates the exemplary mappings.

TABLE I

| Received Text In Value | Indices | Character Memory Table Index | Output from All Character Table |
|---|---|---|---|
| + | + | 41 | H |
| H | H | 70 | e |
| O | O | 77 | l |
| S | S | 80 | p |

When acquiring each text out value, a location coordinate can also be obtained. In one embodiment, the location coordinates can be top, left location for the location coordinate top and left for a particular text output value. A height and width can also be determined. Hence, every text output value can be represented as a rectangle block. Additionally, each text output value can identify its row and column to which it belongs. In one implementation, a map memory can be created to store the location data.

A memory block can be considered as a table that is expanded with row wise and column wise. Based on the top coordinate location for the text output value, the row that the text belongs can be identified. Based on the left coordinate location, the column that the text belongs can be identified. The text out value can be stored to the output memory at a memory block at a row and column location. Thereafter, in one implementation, the output memory can be converted from its row/column blocks to a single string memory block and provided to the RPA system.

Figure 6:
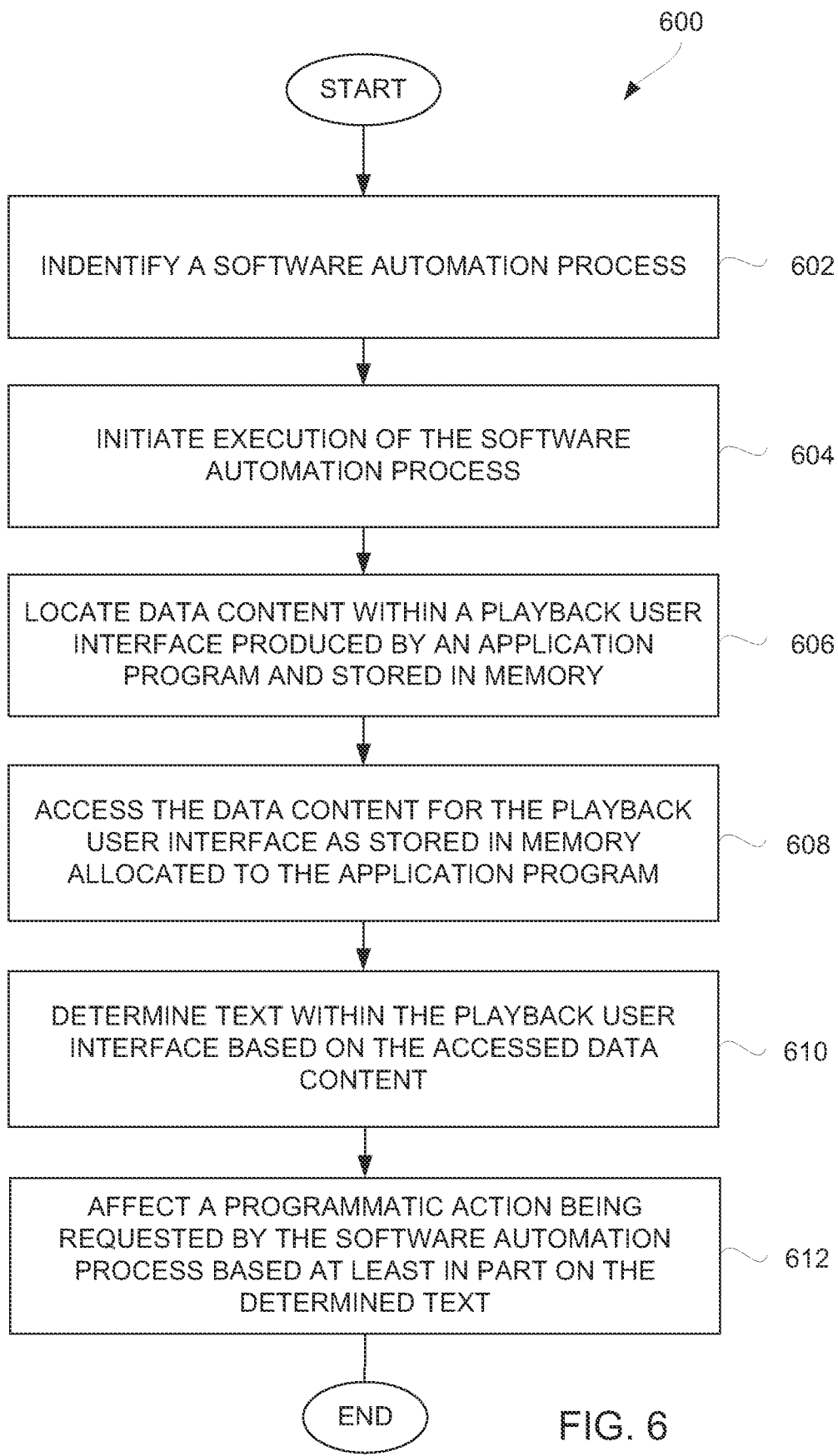
FIG. 6 is a flow diagram of a text recognition process according to one embodiment.

FIG. 6 is a flow diagram of a text recognition process 600 according to one embodiment. The text recognition process 600 and the RPA system can operate on the same or different computing devices. The computing devices can, for example, an electronic, such as a mobile phone (e.g., smart phone), tablet computer, desktop computer, server computer, and the like.

The text recognition process 600 is associated with an RPA system. The RPA system serves to configure or capture one or more software automation processes and then subsequently periodically or as appropriate perform such software automation processes in an automated fashion. For example, the text recognition process 600 can be carried out by the RPA system 100 illustrated in FIG. 1.

The text recognition process 600 can identify 602 a software automation process to be performed. Then, the text recognition process 600 can initiate execution 604 of the software automation process. The execution 604 can be triggered by a user, an event, or a time.

Next, as the software automation process is being executed, data content within a playback user interface that is produced by an application program and being stored in memory can be located 606. The data content for the playback user interface as stored in the memory allocated to the output location program can then be accessed 608. Then, text within the playback user interface can be determined 610 based on the access data content. Thereafter, a programmatic action being requested by the software automation process can be affected 612 based at least in part on the determined text. Thereafter, the text recognition process 600 can end, according to one embodiment.

The various aspects disclosed herein can be utilized with or by robotic process automation systems. Exemplary robotic process automation systems and operations thereof are detailed below.

Figure 7:
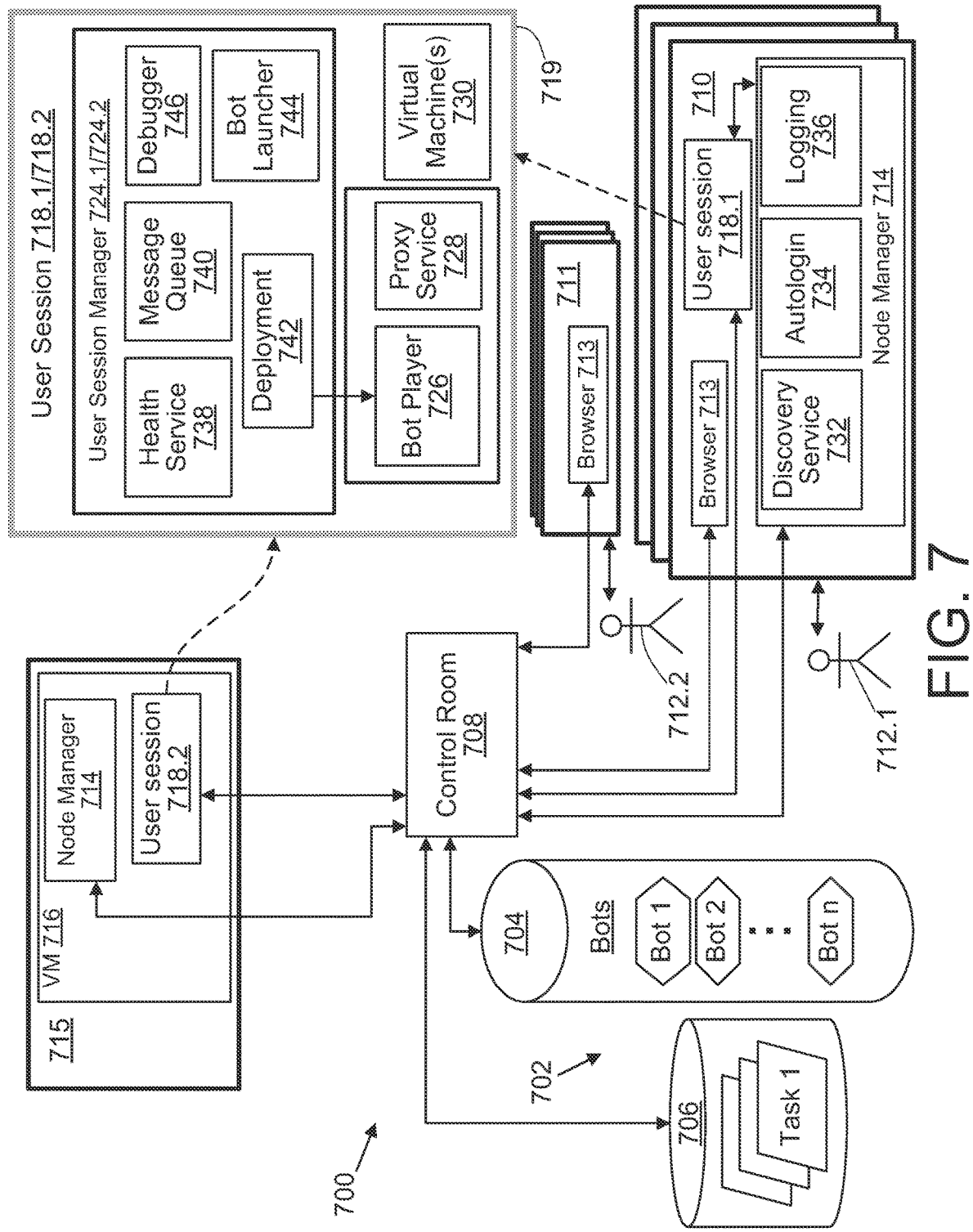
FIG. 7 is a block diagram of a Robotic Process Automation (RPA) system according to one embodiment.

FIG. 7 is a block diagram of a robotic process automation (RPA) system 700 according to one embodiment. The RPA system 700 includes data storage 702. The data storage 702 can store a plurality of software robots 704, also referred to as bots (e.g., Bot 1, Bot 2, . . . , Bot n). The software robots 704 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 726), on which a bot will execute or is executing. The data storage 702 can also stores a plurality of work items 706.

Each work item 706 can pertain to processing executed by one or more of the software robots 704.

The RPA system 700 can also include a control room 708. The control room 708 is operatively coupled to the data storage 702 and is configured to execute instructions that, when executed, cause the RPA system 700 to respond to a request from a client device 710 that is issued by a user 712.1. The control room 708 can act as a server to provide to the client device 710 the capability to perform an automation task to process a work item from the plurality of work items 706. The RPA system 700 is able to support multiple client devices 710 concurrently, each of which will have one or more corresponding user session(s) 718, which provides a context. The context can, for example, include security, permissions, audit trails, etc. to define the permissions and roles for bots operating under the user session 718. For example, a bot executing under a user session, cannot access any files or use any applications that the user, under whose credentials the bot is operating, does not have permission to do so. This prevents any inadvertent or malicious acts from a bot under which bot 704 executes.

The control room 708 can provide, to the client device 710, software code to implement a node manager 714. The node manager 714 executes on the client device 710 and provides a user 712 a visual interface via browser 713 to view progress of and to control execution of automation tasks. It should be noted that the node manager 714 can be provided to the client device 710 on demand, when required by the client device 710, to execute a desired automation task. In one embodiment, the node manager 714 may remain on the client device 710 after completion of the requested automation task to avoid the need to download it again. In another embodiment, the node manager 714 may be deleted from the client device 710 after completion of the requested automation task. The node manager 714 can also maintain a connection to the control room 708 to inform the control room 708 that device 710 is available for service by the control room 708, irrespective of whether a live user session 718 exists. When executing a bot 704, the node manager 714 can impersonate the user 712 by employing credentials associated with the user 712.

The control room 708 initiates, on the client device 710, a user session 718 (seen as a specific instantiation 718.1) to perform the automation task. The control room 708 retrieves the set of task processing instructions 704 that correspond to the work item 706. The task processing instructions 704 that correspond to the work item 706 can execute under control of the user session 718.1, on the client device 710. The node manager 714 can provide update data indicative of status of processing of the work item to the control room 708. The control room 708 can terminate the user session 718.1 upon completion of processing of the work item 706. The user session 718.1 is shown in further detail at 719, where an instance 724.1 of user session manager 724 is seen along with a bot player 726, proxy service 728, and one or more virtual machine(s) 730, such as a virtual machine that runs Java® or Python®. The user session manager 724 provides a generic user session context within which a bot 704 executes.

The bots 704 execute on a player, via a computing device, to perform the functions encoded by the bot. Some or all of the bots 704 may in certain embodiments be located remotely from the control room 708. Moreover, the devices 710 and 711, which may be conventional computing devices, such as for example, personal computers, server computers, laptops, tablets and other portable computing devices, may also be located remotely from the control room 708. The devices 710 and 711 may also take the form of virtual computing devices. The bots 704 and the work items 706 are shown in separate containers for purposes of illustration but they may be stored in separate or the same device(s), or across multiple devices. The control room 708 can perform user management functions, source control of the bots 704, along with providing a dashboard that provides analytics and results of the bots 704, performs license management of software required by the bots 704 and manages overall execution and management of scripts, clients, roles, credentials, security, etc. The major functions performed by the control room 708 can include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 708 is shown generally for simplicity of explanation. Multiple instances of the control room 708 may be employed where large numbers of bots are deployed to provide for scalability of the RPA system 700.

In the event that a device, such as device 711 (e.g., operated by user 712.2) does not satisfy the minimum processing capability to run a node manager 714, the control room 708 can make use of another device, such as device 715, that has the requisite capability. In such case, a node manager 714 within a Virtual Machine (VM), seen as VM 716, can be resident on the device 715. The node manager 714 operating on the device 715 can communicate with browser 713 on device 711. This approach permits RPA system 700 to operate with devices that may have lower processing capability, such as older laptops, desktops, and portable/mobile devices such as tablets and mobile phones. In certain embodiments the browser 713 may take the form of a mobile application stored on the device 711. The control room 708 can establish a user session 718.2 for the user 712.2 while interacting with the control room 708 and the corresponding user session 718.2 operates as described above for user session 718.1 with user session manager 724 operating on device 710 as discussed above.

In certain embodiments, the user session manager 724 provides five functions. First is a health service 738 that maintains and provides a detailed logging of bot execution including monitoring memory and CPU usage by the bot and other parameters such as number of file handles employed. The bots 704 can employ the health service 738 as a resource to pass logging information to the control room 708. Execution of the bot is separately monitored by the user session manager 724 to track memory, CPU, and other system information. The second function provided by the user session manager 724 is a message queue 740 for exchange of data between bots executed within the same user session 718. The third function is a deployment service (also referred to as a deployment module) 742 that connects to the control room 708 to request execution of a requested bot 704. The deployment service 742 can also ensure that the environment is ready for bot execution, such as by making available dependent libraries. The fourth function is a bot launcher 744 which can read metadata associated with a requested bot 704 and launch an appropriate container and begin execution of the requested bot. The fifth function is a debugger service 746 that can be used to debug bot code.

The bot player 726 can execute, or play back, a sequence of instructions encoded in a bot. The sequence of instructions can, for example, be captured by way of a recorder when a human performs those actions, or alternatively the instructions are explicitly coded into the bot. These instructions enable the bot player 726, to perform the same actions as a human would do in their absence. In one implementation, the instructions can compose of a command (action) followed by set of parameters, for example: Open Browser is a command, and a URL would be the parameter for it to launch a web resource. Proxy service 728 can enable integration of external software or applications with the bot to provide specialized services. For example, an externally hosted artificial intelligence system could enable the bot to understand the meaning of a "sentence."

The user 712.1 can interact with node manager 714 via a conventional browser 713 which employs the node manager 714 to communicate with the control room 708. When the user 712.1 logs in from the client device 710 to the control room 708 for the first time, the user 712.1 can be prompted to download and install the node manager 714 on the device 710, if one is not already present. The node manager 714 can establish a web socket connection to the user session manager 724, deployed by the control room 708 that lets the user 712.1 subsequently create, edit, and deploy the bots 704.

Figure 8:
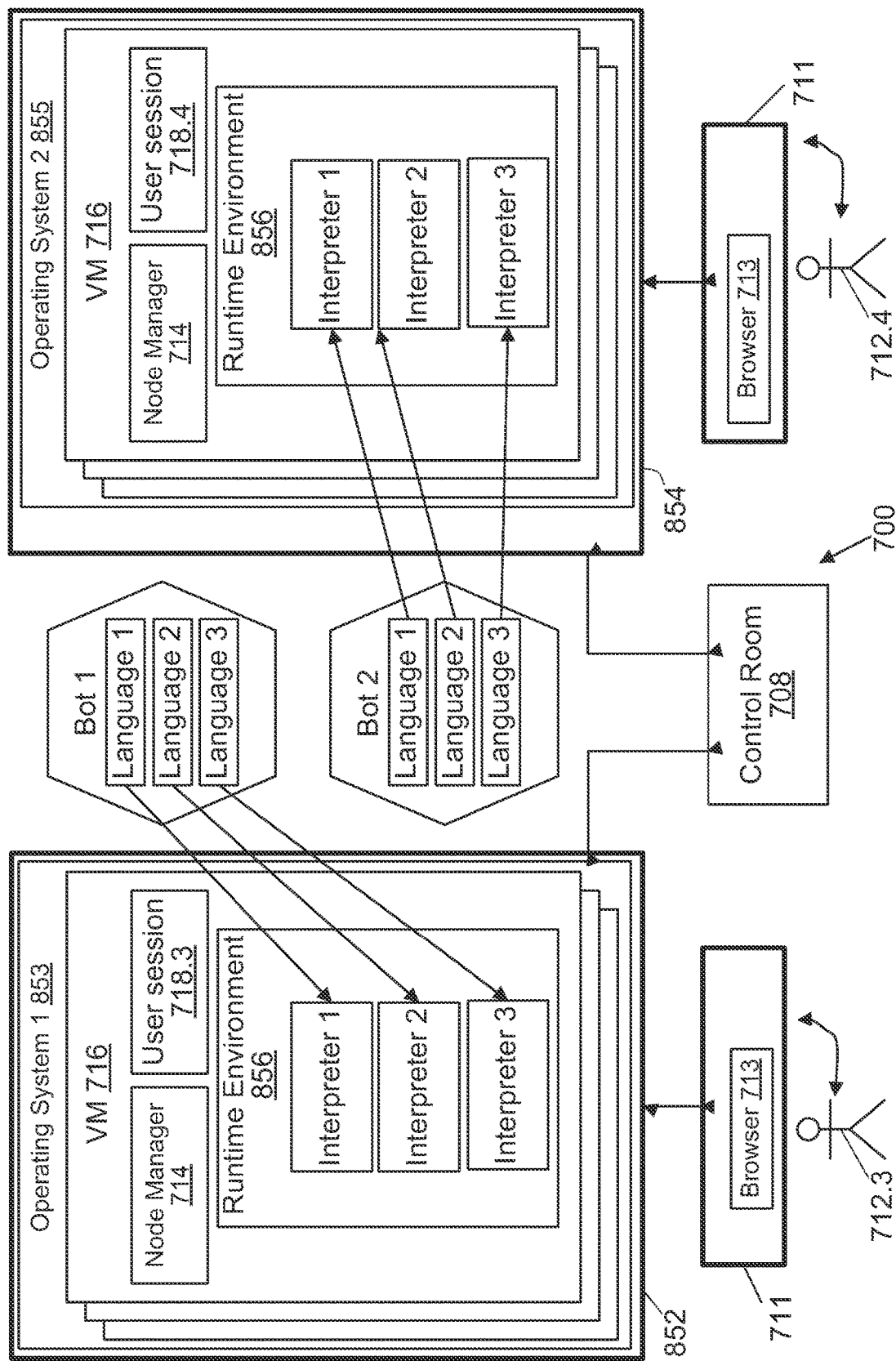
FIG. 8 is a block diagram of a generalized runtime environment for bots in accordance with another embodiment of the RPA system illustrated in FIG. 7.

FIG. 8 is a block diagram of a generalized runtime environment for bots 704 in accordance with another embodiment of the RPA system 700 illustrated in FIG. 7. This flexible runtime environment advantageously permits extensibility of the platform to enable use of various languages in encoding bots. In the embodiment of FIG. 8, RPA system 700 generally operates in the manner described in connection with FIG. 7, except that in the embodiment of FIG. 8, some or all of the user sessions 718 execute within a virtual machine 716. This permits the bots 704 to operate on an RPA system 700 that runs on an operating system different from an operating system on which a bot 704 may have been developed. For example, if a bot 704 is developed on the Windows® operating system, the platform agnostic embodiment shown in FIG. 8 permits the bot 704 to be executed on a device 852 or 854 executing an operating system 853 or 855 different than Windows®, such as, for example, Linux. In one embodiment, the VM 716 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 8, multiple devices 852 can execute operating system 1, 853, which may, for example, be a Windows® operating system. Multiple devices 854 can execute operating system 2, 855, which may, for example, be a Linux® operating system. For simplicity of explanation, two different operating systems are shown, by way of example and additional operating systems such as the macOS®, or other operating systems may also be employed on devices 852, 854 or other devices. Each device 852, 854 has installed therein one or more VM's 716, each of which can execute its own operating system (not shown), which may be the same or different than the host operating system 853/855. Each VM 716 has installed, either in advance, or on demand from control room 708, a node manager 714. The embodiment illustrated in FIG. 8 differs from the embodiment shown in FIG. 7 in that the devices 852 and 854 have installed thereon one or more VMs 716 as described above, with each VM 716 having an operating system installed that may or may not be compatible with an operating system required by an automation task. Moreover, each VM has installed thereon a runtime environment 856, each of which has installed thereon one or more interpreters (shown as interpreter 1, interpreter 2, interpreter 3). Three interpreters are shown by way of example but any run time environment 856 may, at any given time, have installed thereupon less than or more than three different interpreters. Each interpreter 856 is specifically encoded to interpret instructions encoded in a particular programming language. For example, interpreter 1 may be encoded to interpret software programs encoded in the Java® programming language, seen in FIG. 8 as language 1 in Bot 1 and Bot 2. Interpreter 2 may be encoded to interpret software programs encoded in the Python® programming language, seen in FIG. 8 as language 2 in Bot 1 and Bot 2, and interpreter 3 may be encoded to interpret software programs encoded in the R programming language, seen in FIG. 8 as language 3 in Bot 1 and Bot 2.

Turning to the bots Bot 1 and Bot 2, each bot may contain instructions encoded in one or more programming languages. In the example shown in FIG. 8, each bot can contain instructions in three different programming languages, for example, Java®, Python® and R. This is for purposes of explanation and the embodiment of FIG. 8 may be able to create and execute bots encoded in more or less than three programming languages. The VMs 716 and the runtime environments 856 permit execution of bots encoded in multiple languages, thereby permitting greater flexibility in encoding bots. Moreover, the VMs 716 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 708 will select a device with a VM 716 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 9:
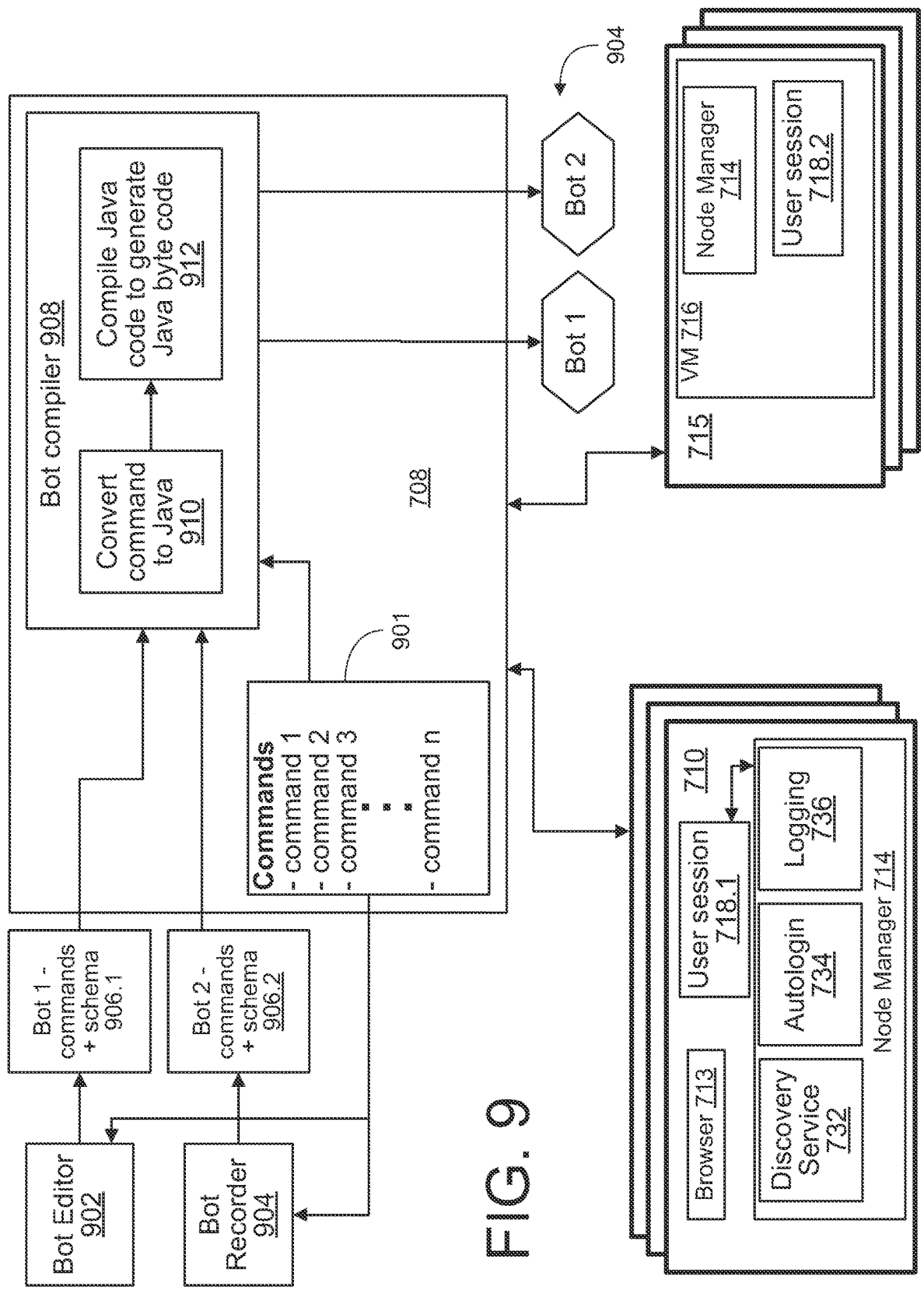
FIG. 9 illustrates a block diagram of yet another embodiment of the RPA system of FIG. 7 configured to provide platform independent sets of task processing instructions for bots.

FIG. 9 illustrates a block diagram of yet another embodiment of the RPA system 700 of FIG. 7 configured to provide platform independent sets of task processing instructions for bots 704. Two bots 704, bot 1 and bot 2 are shown in FIG. 9. Each of bots 1 and 2 are formed from one or more commands 901, each of which specifies a user level operation with a specified application program, or a user level operation provided by an operating system. Sets of commands 906.1 and 906.2 may be generated by bot editor 902 and bot recorder 904, respectively, to define sequences of application level operations that are normally performed by a human user. The bot editor 902 may be configured to combine sequences of commands 901 via an editor. The bot recorder 904 may be configured to record application level operations performed by a user and to convert the operations performed by the user to commands 901. The sets of commands 906.1 and 906.2 generated by the editor 902 and the recorder 904 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 708 operates to compile, via compiler 908, the sets of commands generated by the editor 902 or the recorder 904 into platform independent executables, each of which is also referred to herein as a bot JAR (Java ARchive) that perform application level operations captured by the bot editor 902 and the bot recorder 904. In the embodiment illustrated in FIG. 9, the set of commands 906, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 710 and/or 715 to perform the encoded application level operations that are normally performed by a human user.

Figure 10:
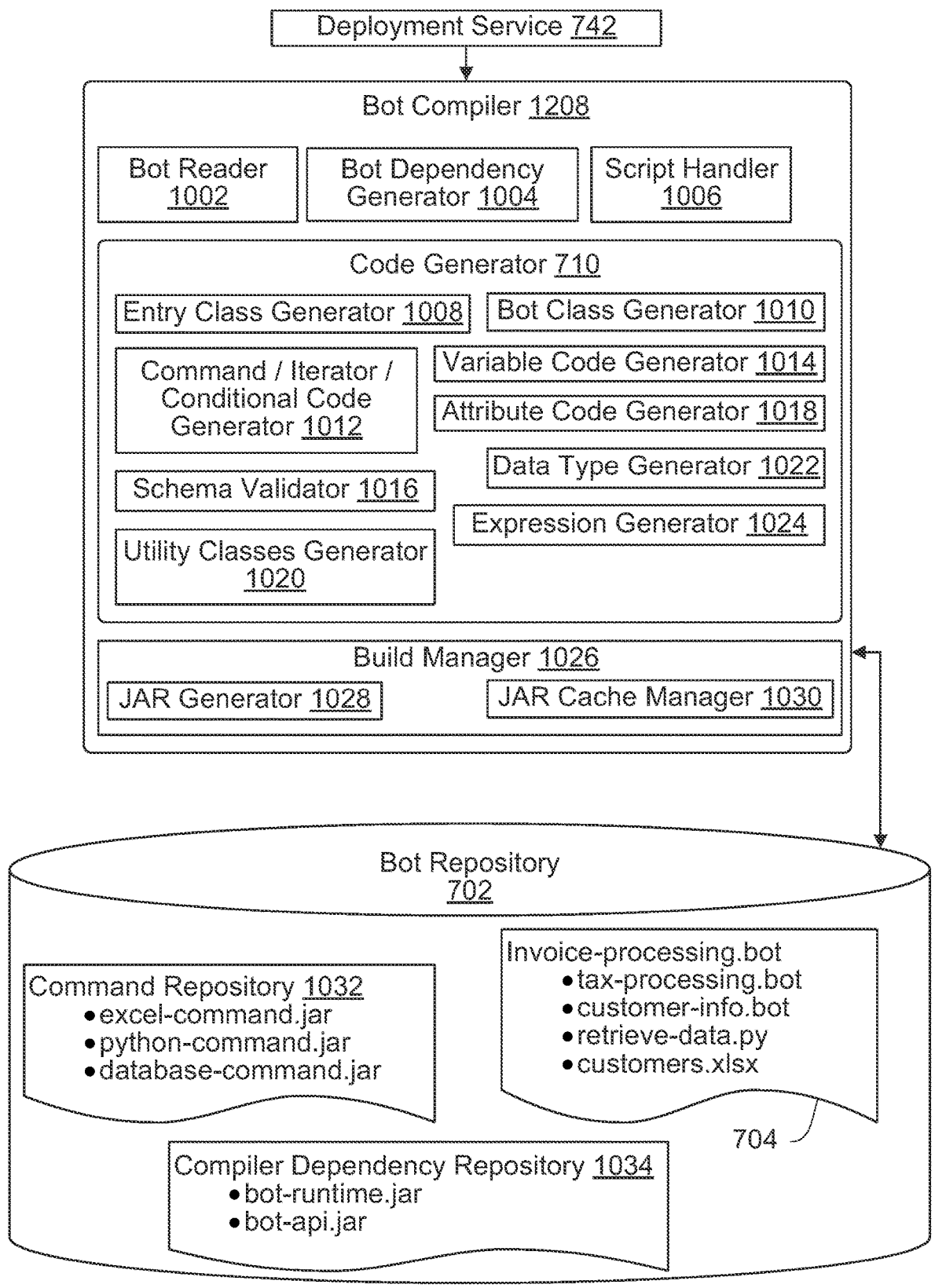
FIG. 10 is a block diagram illustrating details of one embodiment of the bot compiler illustrated in FIG. 9.

FIG. 10 is a block diagram illustrating details of one embodiment of the bot compiler 908 illustrated in FIG. 9. The bot compiler 908 accesses one or more of the bots 704 from the data storage 702, which can serve as bot repository, along with commands 901 that are contained in a command repository 1032. The bot compiler 708 can also access compiler dependency repository 1034. The bot compiler 708 can operate to convert each command 901 via code generator module 910 to an operating system independent format, such as a Java command. The bot compiler 708 then compiles each operating system independent format command into byte code, such as Java byte code, to create a bot JAR. The convert command to Java module 910 is shown in further detail in in FIG. 10 by JAR generator 1028 of a build manager 1026. The compiling to generate Java byte code module 912 can be provided by the JAR generator 1028. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 9, deployment service 742 can be responsible to trigger the process of bot compilation and then once a bot has compiled successfully, to execute the resulting bot JAR on selected devices 710 and/or 715. The bot compiler 908 can comprises a number of functional modules that, when combined, generate a bot 704 in a JAR format. A bot reader 1002 loads a bot file into memory with class representation. The bot reader 1002 takes as input a bot file and generates an in-memory bot structure. A bot dependency generator 1004 identifies and creates a dependency graph for a given bot. It includes any child bot, resource file like script, and document or image used while creating a bot. The bot dependency generator 1004 takes, as input, the output of the bot reader 1002 and provides, as output, a list of direct and transitive bot dependencies. A script handler 1006 handles script execution by injecting a contract into a user script file. The script handler 1006 registers an external script in manifest and bundles the script as a resource in an output JAR. The script handler 1006 takes, as input, the output of the bot reader 1002 and provides, as output, a list of function pointers to execute different types of identified scripts like Python, Java, VB scripts.

An entry class generator 1008 can create a Java class with an entry method, to permit bot execution to be started from that point. For example, the entry class generator 1008 takes, as an input, a parent bot name, such "Invoice-processing-.bot" and generates a Java class having a contract method with a predefined signature. A bot class generator 1010 can generate a bot class and orders command code in sequence of execution. The bot class generator 1010 can take, as input, an in-memory bot structure and generates, as output, a Java class in a predefined structure. A Command/Iterator/Conditional Code Generator 1012 wires up a command class with singleton object creation, manages nested command linking, iterator (loop) generation, and conditional (If/Else If/Else) construct generation. The Command/Iterator/Conditional Code Generator 1012 can take, as input, an in-memory bot structure in JSON format and generates Java code within the bot class. A variable code generator 1014 generates code for user defined variables in the bot, maps bot level data types to Java language compatible types, and assigns initial values provided by user. The variable code generator 1014 takes, as input, an in-memory bot structure and generates Java code within the bot class. A schema validator 1016 can validate user inputs based on command schema and includes syntax and semantic checks on user provided values. The schema validator 1016 can take, as input, an in-memory bot structure and generates validation errors that it detects. The attribute code generator 1018 can generate attribute code, handles the nested nature of attributes, and transforms bot value types to Java language compatible types. The attribute code generator 1018 takes, as input, an in-memory bot structure and generates Java code within the bot class. A utility classes generator 1020 can generate utility classes which are used by an entry class or bot class methods. The utility classes generator 1020 can generate, as output, Java classes. A data type generator 1022 can generate value types useful at runtime. The data type generator 1022 can generate, as output, Java classes. An expression generator 1024 can evaluate user inputs and generates compatible Java code, identifies complex variable mixed user inputs, inject variable values, and transform mathematical expressions. The expression generator 1024 can take, as input, user defined values and generates, as output, Java compatible expressions.

The JAR generator 1028 can compile Java source files, produces byte code and packs everything in a single JAR, including other child bots and file dependencies. The JAR generator 1028 can take, as input, generated Java files, resource files used during the bot creation, bot compiler dependencies, and command packages, and then can generate a JAR artifact as an output. The JAR cache manager 1030 can put a bot JAR in cache repository so that recompilation can be avoided if the bot has not been modified since the last cache entry. The JAR cache manager 1030 can take, as input, a bot JAR.

In one or more embodiment described herein command action logic can be implemented by commands 901 available at the control room 708. This permits the execution environment on a device 710 and/or 715, such as exists in a user session 718, to be agnostic to changes in the command action logic implemented by a bot 704. In other words, the manner in which a command implemented by a bot 704 operates need not be visible to the execution environment in which a bot 704 operates. The execution environment is able to be independent of the command action logic of any commands implemented by bots 704. The result is that changes in any commands 901 supported by the RPA system 700, or addition of new commands 901 to the RPA system 700, do not require an update of the execution environment on devices 710, 715. This avoids what can be a time and resource intensive process in which addition of a new command 901 or change to any command 901 requires an update to the execution environment to each device 710, 715 employed in a RPA system. Take, for example, a bot that employs a command 901 that logs into an on-online service. The command 901 upon execution takes a Uniform Resource Locator (URL), opens (or selects) a browser, retrieves credentials corresponding to a user on behalf of whom the bot is logging in as, and enters the user credentials (e.g. username and password) as specified. If the command 901 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 11:
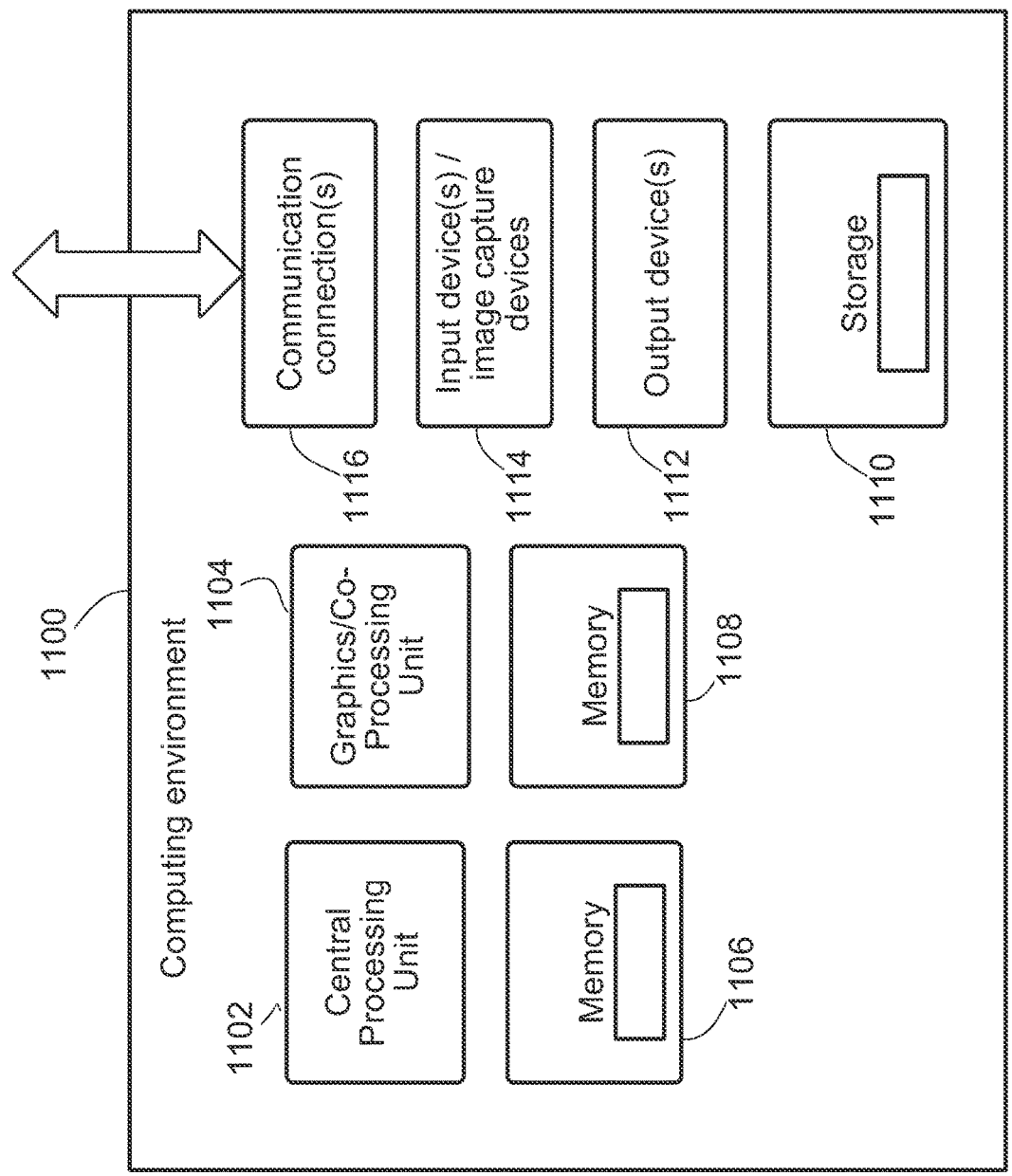
FIG. 11 illustrates a block diagram of an exemplary computing environment for an implementation of an RPA system, such as the RPA systems disclosed herein.

FIG. 11 illustrates a block diagram of an exemplary computing environment 1100 for an implementation of an RPA system, such as the RPA systems disclosed herein. The embodiments described herein may be implemented using the exemplary computing environment 1100. The exemplary computing environment 1100 includes one or more processing units 1102, 1104 and memory 1106, 1108. The processing units 1102, 1106 execute computer-executable instructions. Each of the processing units 1102, 1106 can be a general-purpose central processing unit (CPU), processor in an application-specific integrated circuit (ASIC) or any other type of processor. For example, as shown in FIG. 11, the processing unit 1102 can be a CPU, and the processing unit can be a graphics/co-processing unit (GPU). The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1100 may be rearranged in various embodiments, and some embodiments may not require nor include all of the above components, while other embodiments may include additional components, such as specialized processors and additional memory.

The exemplary computing environment 1100 may have additional features such as, for example, tangible storage 1110, one or more input devices 1114, one or more output devices 1112, and one or more communication connections 1116. An interconnection mechanism (not shown) such as a bus, controller, or network can interconnect the various components of the exemplary computing environment 1100. Typically, operating system software (not shown) provides an operating system for other software executing in the exemplary computing environment 1100, and coordinates activities of the various components of the exemplary computing environment 1100.

The tangible storage 1110 may be removable or non-removable, and includes magnetic disks, magnetic tapes or cassettes, CD-ROMs, DVDs, or any other medium which can be used to store information in a non-transitory way, and which can be accessed within the computing system 1100. The tangible storage 1110 can store instructions for the software implementing one or more features of a PRA system as described herein.

The input device(s) or image capture device(s) 1114 may include, for example, one or more of a touch input device (such as a keyboard, mouse, pen, or trackball), a voice input device, a scanning device, an imaging sensor, touch surface, or any other device capable of providing input to the exemplary computing environment 1100. For multimedia embodiment, the input device(s) 1114 can, for example, include a camera, a video card, a TV tuner card, or similar device that accepts video input in analog or digital form, a microphone, an audio card, or a CD-ROM or CD-RW that reads audio/video samples into the exemplary computing environment 1100. The output device(s) 1112 can, for example, include a display, a printer, a speaker, a CD-writer, or any another device that provides output from the exemplary computing environment 1100.

The one or more communication connections 1116 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for facilitating robotic process automation, the method comprising:
   identifying a software automation process that facilitates automation of a previously captured series of user interactions;
   initiating execution of the software automation process, the software automation process configured to interact with at least one user interface produced by an application program operating on the at least one computing device, the at least one user interface presented on a display screen associated with at least one computing device;
   locating data content within the user interface as stored in memory of the at least one computing device that is allocated to the application program;
   accessing the data content for the at least one user interface from the memory of the at least one computing device allocated to the application program;
   determining text within the at least one user interface based on the accessed data content; and
   affecting a programmatic action with respect to the application program, the programmatic action being requested by the software automation process based at least in part on the determined text.

2. The computer-implemented method as recited in claim 1, wherein the accessing of the data content from the memory uses text access program code that is placed in the memory allocated to the application program.

3. The computer-implemented method as recited in claim 2, wherein the accessing of the data content from the memory comprises:
   detecting a redraw command from the application program to redraw the at least one user interface; and
   in response to the detecting of the redraw command, invoking the text access code to acquire the data content for the at least one user interface from the memory.

4. The computer-implemented method as recited in claim 1, wherein the accessing of the data content from the memory comprises capturing graphical characters pertaining to text within the at least one user interface produced by the application program.

5. The computer-implemented method as recited in claim 4, wherein the determining text within the at least one user interface comprises converting the captured graphical characters to alphanumeric codes.

6. The computer-implemented method as recited in claim 5, wherein the data content comprises glyph indices or characters, and
   wherein the determining text within the at least one user interface comprises converting the captured graphical characters to alphanumeric codes.

7. The computer-implemented method as recited in claim 6,
   wherein the accessing of the data content from the memory uses text access program code that is placed in the memory allocated to the application program, and
   wherein the accessing of the data content from the memory comprises:
   detecting a redraw command from the application program to redraw the at least one user interface; and
   in response to the detecting of the redraw command, invoking the text access code to acquire the data content for the at least one user interface from the memory.

8. The computer-implemented method as recited in claim 1, wherein the method comprises:
   displaying a user interface containing the determined text and that textually resembles the at least one user interface.

9. A non-transitory computer readable medium including at least computer program code tangible stored thereon for facilitating robotic process automation, the computer readable medium comprising:
   computer program code for identifying a software automation process that facilitates automation of a previously captured series of user interactions;
   computer program code for initiating execution of the software automation process, the software automation process configured to interact with at least one user interface produced by an application program operating on the at least one computing device, the at least one user interface presented on a display screen associated with at least one computing device;

computer program code for locating data content within the user interface as stored in memory of the at least one computing device that is allocated to the application program;

computer program code for accessing the data content for the at least one user interface from the memory of the at least one computing device allocated to the application program, wherein the computer program code for accessing of the data content from the memory operates to access the data content from memory based on a user interface command from the application program;

computer program code for determining text within the at least one user interface based on the accessed data content; and computer program code for affecting a programmatic action with respect to the application program, the programmatic action being requested by the software automation process based at least in part on the determined text.

10. The non-transitory computer readable medium as recited in claim 9, wherein the computer program code for accessing of the data content from the memory uses text access program code that is placed in the memory allocated to the application program.

11. The non-transitory computer readable medium as recited in claim 10, wherein the computer program code for accessing of the data content from the memory comprises:

computer program code for detecting the user interface command from the application program, wherein the user interface command requests to redraw the at least one user interface; and computer program code for invoking the text access code, in response to the detecting of the user interface command, to acquire the data content for the at least one user interface from the memory.

12. The non-transitory computer readable medium as recited in claim 9, wherein the computer program code for accessing of the data content from the memory comprises captures graphical characters pertaining to text within the at least one user interface produced by the application program.

13. The non-transitory computer readable medium as recited in claim 12, wherein the computer program code for determining text within the at least one user interface comprises computer program code for converting the captured graphical characters to alphanumeric codes.

14. The non-transitory computer readable medium as recited in claim 12, wherein the data content comprises glyph indices or characters, and wherein the computer program code for determining text within the at least one user interface comprises computer program code for converting the captured graphical characters to alphanumeric codes.

15. The non-transitory computer readable medium as recited in claim 14, wherein the computer program code for accessing of the data content from the memory uses text access program code that is placed in the memory allocated to the application program, and wherein the computer program code for accessing of the data content from the memory comprises:

computer program code for detecting the user interface command from the application program, wherein the user interface command requests to redraw the at least one user interface; and computer program code for invoking the text access code, in response to the detecting of the user interface command, to acquire the data content for the at least one user interface from the memory.

16. The non-transitory computer readable medium as recited in claim 9, wherein the non-transitory computer readable medium comprises:

computer program code for displaying a user interface containing the determined text and that textually resembles the at least one user interface.

\* \* \* \* \*